United States Patent [19]

Fischer et al.

[11] 4,448,853

[45] May 15, 1984

[54] LAYERED ACTIVE BRAZING MATERIAL AND METHOD FOR PRODUCING IT

[75] Inventors: Melch Fischer, Dietikon; Kurt Brunner, Wettingen, both of Switzerland

[73] Assignee: BBC Brown, Boveri & Company, Limited, Baden, Switzerland

[21] Appl. No.: 254,511

[22] Filed: Apr. 15, 1981

[51] Int. Cl.³ .................... B23K 35/20; C22C 9/00; C22C 14/00

[52] U.S. Cl. .................................. 428/607; 428/674; 428/675; 428/651; 428/652; 428/660; 428/661; 228/263.12; 228/263.11; 148/403

[58] Field of Search ............. 428/607, 606, 675, 674, 428/660, 661, 652, 651, 662, 663; 228/263 R, 228/263 A, 263 B, 263 C, 263 D, 263 E, 263 F; 228/263 G, 263 H, 263.12, 263.11, 194; 148/403; 420/417, 422, 423

[56] References Cited

U.S. PATENT DOCUMENTS

| | | | |
|---|---|---|---|
| 2,474,643 | 6/1949 | Webb | 228/263 A |
| 2,964,398 | 12/1960 | Rhys | 228/263.11 |
| 3,034,205 | 5/1962 | Ames | 228/263.11 |
| 3,091,028 | 5/1963 | Westbrook et al. | 420/417 |
| 3,177,054 | 4/1965 | Moriguchi | 428/607 |
| 3,181,935 | 5/1965 | Coad | 428/607 |
| 3,197,859 | 8/1965 | Cape | 228/263.11 |
| 3,198,609 | 8/1965 | Cape | 228/263.11 |
| 3,565,591 | 2/1971 | Caronico et al. | 420/417 |
| 3,666,429 | 5/1972 | Campbell et al. | 420/422 |
| 3,675,311 | 7/1972 | Wells | 228/194 |
| 3,676,088 | 7/1972 | Pryor | 428/655 |
| 3,708,866 | 1/1973 | Wells | 228/193 |
| 3,940,293 | 2/1976 | Polk | 148/11.5 F |
| 3,948,432 | 4/1976 | Pryor et al. | 228/263.11 |
| 4,026,677 | 5/1977 | Galasso et al. | 428/649 |
| 4,050,931 | 9/1977 | Tanner et al. | 420/417 |
| 4,148,973 | 4/1979 | Sexton | 228/263 D |
| 4,182,628 | 1/1980 | D'Silva | 420/502 |
| 4,201,601 | 5/1980 | D'Silva | 428/606 |
| 4,209,570 | 6/1980 | DeCristofaro | 228/263 R |
| 4,250,229 | 2/1981 | Kear | 428/607 |
| 4,314,661 | 2/1982 | DeCristofaro | 228/263 D |
| 4,340,650 | 7/1982 | Pattanaik | 228/263 A |

FOREIGN PATENT DOCUMENTS

279320  8/1970  U.S.S.R. .................. 228/263.11

OTHER PUBLICATIONS

"Semialloy Brazing Alloys," *Semi–Alloys*-brochure, Jul. 22, 1968, 20 N. MacQuesten Parkway, Mount Vernon, NY.

"Brazing with Foil Cuts Costs, Speeds Assembly, Strengthens Jet Engine Ports," *Assembly Engineering*, Mar. 1980.

"Metglas Brazing Foils," DeCristofaro et al., *Welding Journal*, Jul. 1978, pp. 33-38.

"Comparison of Gold Nickel with Nickel Base Metallic Gloss Brazing Foils", Bose et al., *Welding Journal*, Oct. 1981, pp. 29-34.

*Primary Examiner*—M. J. Andrews
*Assistant Examiner*—John J. Zimmerman
*Attorney, Agent, or Firm*—Oblon, Fisher, Spivak, McClelland & Maier

[57] ABSTRACT

Layered active brazing material in the form of two microcrystalline or amorphous foils applied to both sides of a ductile metal ribbon acting as a carrier. The foils consist of an alloy containing two or more of the elements Cu, Ti, Ge, Si, Ag, Zr, Ni, Al, Fe and are produced by spraying the molten alloy onto a rapidly rotating, cooled copper cylinder, and the resulting ribbon detaching itself from the cylinder. Production of the ductile metal body covered on both sides with foils using spot welding.

6 Claims, No Drawings

LAYERED ACTIVE BRAZING MATERIAL AND METHOD FOR PRODUCING IT

This invention relates to a layered active brazing material of the type disclosed in claim 1 and a method for producing it as disclosed in claim 5.

Active brazing materials are frequently used for joining ceramic and metal parts together. They are distinguished by containing an element of high oxygen affinity, which satisfies the prerequisite for wetting the ceramic surface. Such brazing materials are, with few exceptions e.g. those based on Ag/Cu/Ti with relatively low titanium content, generally very brittle and are usually applied to the part to be brazed in powder form (see e.g. C. W. Fox and S. M. Slaughter, "brazing of ceramics," Welding Journal 43, p. 591-597, July 1964; D. A. Canonico et al, "Direct Brazing of Ceramics, Graphite and Refractory Metals," Welding Journal 56, p. 31-38, August 1977). Typical examples would be alloys of Ti/Zr/Be, Ti/Cu/Be, Ti/V/Cr, Ti/Zr/Ta. Other known possibilities are active brazing materials in the form of wires or foils of composite material e.g. a eutectic Ag/Cu core with Ti-casing, or separate semi-finished parts of Ag and Zr placed upon one another (see H. Bender, "High Temperature Metal-Ceramic Seals," Ceramic Age 63, p. 15-50, 46-50 April 1954).

Ductile brazing materials, for example based upon Ag/Cu/Ti, can be worked into wires or foils, but only contain a small content (a few atomic percent) of elements showing high oxygen affinity. They are in addition relatively expensive due to their high silver content. Due to the limited titanium content the wettability of the ceramic surface is insufficient for many applications.

The brittle brazing materials mentioned above cannot be hot worked to a suitable shape, and are usually only available in powder form. They have, therefore, to be applied to the surfaces to be brazed by emulsion formation and spraying. This introduces a number of problems concerning adhesive strength to the surface, probability of oxidation due to the smallness of the powder particles, homogeneity of the brazed layer, etc. As a result there is therefore a need for supplying an active brazing material in compact form, in particular as a foil.

A technique referred to as "melt spinning" has been developed to produce amorphous metals, which amongst others are used as brazing materials (see N. De Cristofaro and C. Henschel, Metglas Brazing Foils, Welding Journal, July 1978). The cooling of a molten metal is carried out in such a manner that crystalliteformation does not occur, instead the undercooled melt "solidifies" as a glass.

The use of the "melt spinning" technique producing a ductile amorphous or microcrystalline foil in band form has already been suggested. Such foils are easy to handle and very suitable for metal-ceramic bonds. However, in the event that more stringent requirements are made upon strength and temperature insensitivity, they become unable to accomodate the shear faces arising.

The objective behind this invention is to suggest both an active brazing material in ribbon form, and a method of producing it which, with the highest possible ductility, allows materials of extremely dissimilar thermal expansion coefficients to be brazed to thermoshock insensitive pieces.

According to the invention this task will be solved through the characteristics of claims 1 and 5.

The invention will be illustrated with the following example.

EXAMPLE 1

The "melt spinning" technique was applied to the following manner to convert a normally brittle active brazing material into a thin foil suitable for brazing.

An alloy of the following composition was chosen as starting material:
Copper: 60 atomic %,
Titanium: 40 atomic %, The individual components were melted in the stated relationship in an arc furnace. The charge was remelted and allowed to solidify a number of times in order to attain as homogeneous a concentration distribution as possible over the whole cross section. After the last solidification the alloy was mechanically reduced to a particle size of a few millimeters and used to fill a quartz tube of 9 mm inside diameter and 150 mm length to a height of 50 mm. The lower end of the quartz tube contained a slit-like opening of 10 mm width and 0.25 mm breadth was squashed flat. The upper cylindrical end of the quartz tube was attached by a rubber hose to a pressurized inert gas source. Subsequently the quartz tube was placed in the helical-shaped heating element of an induction furnace and situated with respect to a copper cylinder, whose axis was mounted horizontally, such that the slit lay at an angle of 30° to the vertical (in the opposite sense to the rotation direction of the copper cylinder) and at a distance of 2 mm to the cylinder surface. The slit itself lay parallel to the axis of the cylinder. The axis of the quartz tube made an angle of 70° with the tangent to the copper cylinder (20° to the radius against the direction of rotation). The copper cylinder had an outside diameter of 300 mm and an axial length of 50 mm. The whole arrangement was then built into a vacuum chamber (pressure $\leq 10^{-3}$ m bar) which was filled with nitrogen to a pressure of 0.8 bar. The copper cylinder was set into rotation with a circumferential speed of 30 m/s. Through switching on the heating element the contents of the quartz tube were heated to a casting temperature which lay approx. 100° C. above the liquidus temperature. By opening a tap between the rubber hose and the pressure reservoir a pressure of 0.7 bar, with respect to the chamber pressure, was exerted upon the melt situated in the quartz tube. The melt was thereby sprayed onto the rotating copper cylinder in the form of a flat, ribbon-shaped stream, and cooled at a rate of $10^6$ C/s. This solidified in the form of a ribbon, which after travelling approximately 50 mm separated on its own from the cylinder and flew off into the surrounding space. The product was a ribbon of about 10 mm width, 50 $\mu$m thickness and approximately 4 m length. The surface which had lain adjacent to that of the copper cylinder exhibited a roughness of less than 1 $\mu$m, the remaining one about 3 $\mu$m. The alloy contained a homogeneous microcrystalline structure with average crystallite size less than 3 $\mu$m. The surface of the ribbon was free from traces of oxides.

A trilayered body was constructed by spot welding the above ribbon onto both sides of a square piece of oxygen-free copper sheet measuring 4 cm² by between 0.3 mm and 0.5 mm thickness. The layered active brazing material produced in this way was clamped in place between a block of carbon steel and a platlet of zirconium oxide of 4 cm² area and 0.3 cm thickness using a tungsten weight producing a pressure of 6000 Pa. The brazing process was carried out by placing the work piece arranged in the above manner in a high vacuum brazing furnace at a pressure of $10^{-4}$ Torr and heating it to a temperature of 985° C. during 30 minutes. This temperature was maintained for 5 minutes, before cooling to room temperature in less than 60 minutes. Hydrogen at a pressure of $10^{-3}$ Torr can be used instead of a high vacuum.

The strength of the finished, brazed metal-ceramic work piece was tested by quenching it a number of times into water from a temperature of 600° C. It proved to be completely thermoshock insensitive since no cracks could be detected. The shear strength of the bord was in each case more than 100 MPa.

The flat ductile metal body which acts as a carrier for the active brazing foil can be in sheet or ribbon form with a thickness of 0.3 mm to 1 mm. In addition to copper, copper alloys, in particular those of copper/beryllium and copper/nickel, can also be used. Other suitable materials are tantalum, zirconium, niobium, molybdenum, aluminum and aluminium alloys. The choice depends upon the types of material to be bonded, the purpose to which the work piece will be put, and the conditions (temperature, atmosphere, etc.) of use.

The technique need not only be used to join steel and zirconium oxide. On the ceramic side aluminium oxide, saphire, aluminium oxide/titanium carbide mixtures, vanadium oxide, silicon carbide, silicon nitride, etc. can be used. On the metal side tantalum, niobium, tungsten, tungsten-copper alloys and many other alloys can be used instead of copper and copper alloys. The range of application of the type of composite materials suggested by this invention covers a wide area of the machine construction and electrical industry.

The following alloys, which usually exhibit a brittle cast structure unsuitable for further treatment, can, by applying the above technique, be converted to a foil with amorphous or microcrystalline structure with grain size less than 3 µm, 30 µm to 100 µm thickness and 2 mm to 30 mm width:

binary and ternary copper alloys with at least 40 atomic % copper,
binary copper/titanium alloys with 40 to 85 atomic % copper, remainder titanium,
copper/titanium/germanium alloys,
copper/titanium/silicon alloys,
copper/zirconium/silicon alloys
copper zirconium/germanium alloys,
nickel/titanium/silicon alloys,
nickel/titanium/germanium alloys,
zirconium/aluminium/silicon alloys,
zirconium/aluminium/germanium alloys,
zirconium/iron/silicon alloys,
zirconium/iron/germanium alloys,
zirconium/nickel/silicon alloys,
zirconium/nickel/germanium alloys.

Using the layered active brazing material described by this invention with metal foil carrier and microcrystalline to amorphous structure, a type of material could be produced which, thanks to its high content of elements with oxygen affinity, is particularly suitable for the bonding of ceramic and metal parts. This type of joint finds quite general application throughout the machine construction and electricity industries, in particular for semiconductor and high-vacuum products. They are remarkable for possessing a high thermoshock insensitivity and current carrying capacity under extremely fast temperature cycling.

We claim:

1. A layered active brazing material being in the form of two thin foils selected from the group consisting of binary and ternary copper alloys with at least 40 atomic percent copper selected from the group consisting of binary copper/titanium alloys with 40 to 85 atomic percent copper with the remainder titanium,
copper/titanium/germanium alloys,
copper/titanium/silicon alloys,
copper/zirconium/silicon alloys, and
copper/zirconium/germanium alloys;
nickel/titanium/silicon alloys;
nickel/titanium/germanium alloys;
zirconium/aluminum/silicon alloys;
zirconium/aluminum/germanium alloys;
zirconium/iron/silicon alloys;
zirconium/iron/germanium alloys;
zirconium/nickel/silicon alloys; and
zirconium/nickel/germanium alloys; with structure ranging from microcrystalline to amorphous, said foils being applied to both sides of a flat ductile metallic carrier, said carrier being in the form of a ribbon or sheet and consisting of copper, a copper alloy, tantalum, zirconium, niobium, molybdenum, aluminum, or an aluminum alloy.

2. The layered active brazing material according to claim 1, wherein said metallic carrier is in the form of a ribbon or sheet with thickness ranging from 0.3 mm to 1 mm.

3. Layered active brazing material according to claim 1 such that the foil applied to both sides of the ductile metallic carrier is attached to it by spot welding.

4. The layered active brazing material according to claim 1, wherein said copper alloy is a copper-beryllium alloy or a copper-nickel alloy.

5. Layered active brazing material according to claim 1 with the foil having a thickness of 30 µm to 100 µm and a width of 2 mm to 30 mm.

6. The layered active brazing material according to claim 5, wherein said foil has a microcrystalline structure with an average diameter of the crystallites of less than 3 µm.

* * * * *